US011469703B2

(12) United States Patent
Tsai et al.

(10) Patent No.: US 11,469,703 B2
(45) Date of Patent: Oct. 11, 2022

(54) CIRCUIT SYSTEM AND CIRCUIT CONTROL METHOD APPLIED TO MOTOR DRIVE

(71) Applicant: NATIONAL CHENG KUNG UNIVERSITY, Tainan (TW)

(72) Inventors: Mi-Ching Tsai, Tainan (TW); Fu-Sheng Pai, Tainan (TW); Min-Fu Hsieh, Tainan (TW); Kai-Jung Shih, Tainan (TW); Zheng-Xuan Wu, Taichung (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 17/335,589

(22) Filed: Jun. 1, 2021

(65) Prior Publication Data
US 2021/0399669 A1    Dec. 23, 2021

(30) Foreign Application Priority Data
Jun. 20, 2020 (TW) ................. 109120997

(51) Int. Cl.
*H02P 27/08* (2006.01)
(52) U.S. Cl.
CPC ........ *H02P 27/085* (2013.01); *H02P 2201/09* (2013.01)

(58) Field of Classification Search
CPC .. H02P 27/085; H02P 2201/09; H02M 7/5395
See application file for complete search history.

(56) References Cited

U.S. PATENT DOCUMENTS

| 2009/0243523 A1* | 10/2009 | Tanaka | B60W 10/08 180/65.285 |
| 2014/0232304 A1* | 8/2014 | Sekiya | H02P 21/36 318/400.02 |
| 2017/0305274 A1* | 10/2017 | Saha | B60L 3/003 |
| 2018/0251036 A1* | 9/2018 | Tapadia | H02M 7/5395 |

* cited by examiner

*Primary Examiner* — Rina I Duda
(74) *Attorney, Agent, or Firm* — Rosenberg, Klein & Lee (57) ABSTRACT

A circuit system and a circuit control method applied to a motor drive are disclosed. The circuit control method includes the steps of providing a phase-locked circuit unit and providing a PWM control unit. The phase-locked circuit unit enables a first carrier signal and a second carrier signal to have identical amplitudes and starting points. The PWM control unit compares the first carrier signal with a reference signal for controlling a switch. When a load current is independently supplied by at least one DC capacitor, a SVPWM control unit controls an inverter unit for the load current to be zero, thereby reducing DC voltage ripple, operation loss and transient voltage surge.

6 Claims, 7 Drawing Sheets

CIRCUIT SYSTEM AND CIRCUIT CONTROL METHOD APPLIED TO MOTOR DRIVE

FIELD OF THE INVENTION

The present invention relates to a circuit system and a circuit control method, and more particularly to a circuit system and a circuit control method applied to a motor drive.

BACKGROUND OF THE INVENTION

In these days, people pay more attention to environmental issues such as the global greenhouse effect, energy saving and carbon reduction. All countries are implementing reductions in the use of fossil fuels. In the developments of various vehicles, the use of electric motors to replace traditional fuel engines has become a common and clear trend. According to the research conducted by the International Energy Agency, there will be large rechargeable electric vehicles on the market throughout the world in the next 30 years. For example, the unmanned vehicle system used in the intelligent production system can offset the operating energy of about three transport operators and one traditional transport vehicle from the perspective of economic benefits. Therefore, the development of electric vehicles has become an important part of improving the efficiency of industrial production.

Most of the existing power supply systems for electric vehicles use high-voltage lithium batteries or nickel-metal hydride battery packs as the main battery to supply power to the inverter to drive the motor, and then use low-voltage batteries as the secondary battery to supply power to the dashboard and other automotive electronic and electrical equipment. However, in the start-up process or the switching process, inrush current surges, ripples, etc. are often generated, shortening the service life of the load.

Chinese Patent Publication No. CN 110620497 A discloses a control method and circuit for suppressing a starting impulse current of a three-phase PWM rectifier. The method comprises steps of designing a starting impulse current suppressor by a nonlinear gal function; sampling a signal; smoothing a direct-current bus voltage step given instruction, calculating a deviation signal Δu, and calculating a d-axis grid-side current; acquiring a real-time phase θ, and performing abc-dq coordinate conversion of the three-phase inductive current to obtain an inductive current d-axis component and an inductive current q-axis component under a synchronous rotating coordinate system; calculating a d-axis current error Δi to obtain a d-axis control voltage; performing dq-αβ coordinate conversion of the control voltage through the real-time phase θ to obtain an α-axis component and a β-axis component of the control voltage; and inputting the control voltage into an SVPWM modulator to obtain a pulse signal. The method is advantaged in that steady-state performance and dynamic performance of an original system are not influenced; the sampling amount is not increased, hardware cost is not increased, control steps are simple, and implementation is easy; the impact current in the starting process can be effectively reduced, the service life of a system is prolonged, and stability and reliability of the system are improved.

However, the aforementioned patent cannot reduce the ripple effectively, and may affect the service life of the load.

SUMMARY OF THE INVENTION

According to one aspect of the present invention, a circuit system applied to a motor drive is provided. The present invention comprises a voltage-stabilizing unit, a DC power conversion unit, an inverter unit, and a phase-locked circuit unit. The DC power conversion unit is electrically connected to the voltage-stabilizing unit. The DC power conversion unit includes a PWM control unit, a first switch, a second switch, and at least one DC capacitor. The inverter unit is electrically connected to the DC power conversion unit. The inverter unit includes an SVPWM control unit and a power transistor. The phase-locked circuit unit is electrically connected to the DC power conversion unit and the inverter unit. The phase-locked circuit unit enables a first carrier signal generated by the DC power conversion unit and a second carrier signal generated by the inverter unit to have identical amplitudes and starting points. The voltage-stabilizing unit generates a reference signal to the DC power conversion unit. The PWM control unit compares the first carrier signal with the reference signal. The PWM control unit generates a turn-on command or a turn-off command of the first switch and the second switch according to a comparison result. When the PWM control unit drives the first switch and the second switch to turn on or off, a load current sent to the inverter unit is independently supplied by the capacitor. The SVPWM control unit controls the power transistor of an upper arm of the inverter unit to turn on or the power transistor of a lower arm of the inverter unit to turn on, so that the load current is zero.

Preferably, the DC power conversion unit includes an inductor. When a magnitude of the first carrier signal is less than a reference value of the reference signal, the PWM control unit drives the first switch to turn off and the second switch to turn on, and the load current sent to the inverter unit is independently supplied by the DC capacitor. When the magnitude of the first carrier signal is greater than the reference value, the PWM control unit drives the first switch to turn on and the second switch to turn off, and an electric energy stored in the inductor is transferred to the capacitor for storage and converted into the load current.

Preferably, the DC power conversion unit is a DC-to-DC power converter.

According to another aspect of the present invention, a circuit control method applied to a motor drive is provided. The circuit control method comprises the steps of providing a phase-locked circuit unit and providing a voltage-stabilizing unit. The phase-locked circuit unit enables a first carrier signal generated by a DC power conversion unit and a second carrier signal generated by an inverter unit to have identical amplitudes and starting points. The voltage-stabilizing unit generates a reference signal to the DC power conversion unit. A PWM control unit of the DC power conversion unit compares the first carrier signal with the reference signal. The PWM control unit generates a turn-on command or a turn-off command of a switch according to a comparison result. When the PWM control unit drives the switch to turn on or off, a load current sent to the inverter unit is independently supplied by the DC capacitor. A SVPWM control unit of the inverter unit controls a power transistor of an upper arm of the inverter unit to turn on or the power transistor of a lower arm of the inverter unit to turn on, so that the load current is zero.

Preferably, the switch includes a first switch and a second switch. When a magnitude of the first carrier signal is less than a reference value of the reference signal, the PWM control unit drives the first switch to turn off and the second switch to turn on, and the load current sent to the inverter unit is independently supplied by the capacitor. When the magnitude of the first carrier signal is greater than the reference value, the PWM control unit drives the first switch to turn on and the second switch to turn off, and an electric energy stored in an inductor of the DC power conversion unit is transferred to the DC capacitor for storage and converted into the load current.

Preferably, the DC power conversion unit is a DC-to-DC power converter.

According to the above technical features, the following effects can be achieved:

1. Through the phase-locked circuit unit, the first state corresponds to that the upper arms or the lower arms of the first arm, the second arm and the third arm are all turned on. At this time, the load current is zero, which can reduce the time that the capacitor alone supplies the load current, reduce the DC voltage ripple effectively, and reduce the operation loss when the first switch and the second switch are switched and the transient voltage surge of the drain and source of the first switch and the second switch.

2. Because the DC voltage ripple is reduced, when driving a motor of the same specification, the required DC capacitance value is reduced, the number of the required DC capacitors is reduced, the overall volume of the circuit is reduced, and the power density and operating reliability of the drive circuit of the motor is further improved.

3. Because the DC voltage ripple is reduced, the motor torque ripple can be reduced under the same control parameters of the inverter unit.

4. The motor can still be driven accurately, and the original function of driving the motor accurately will not be affected due to other functions.

5. The stability of the output voltage is high. The integrated control circuit makes the cost of the control system lower. The service life of the DC capacitor is longer. The rotating speed and torque of the motor are more stable.

DESCRIPTION OF THE PREFERRED EMBODIMENTS

Embodiments of the present invention will now be described, by way of example only, with reference to the accompanying drawings.

Figure 1:
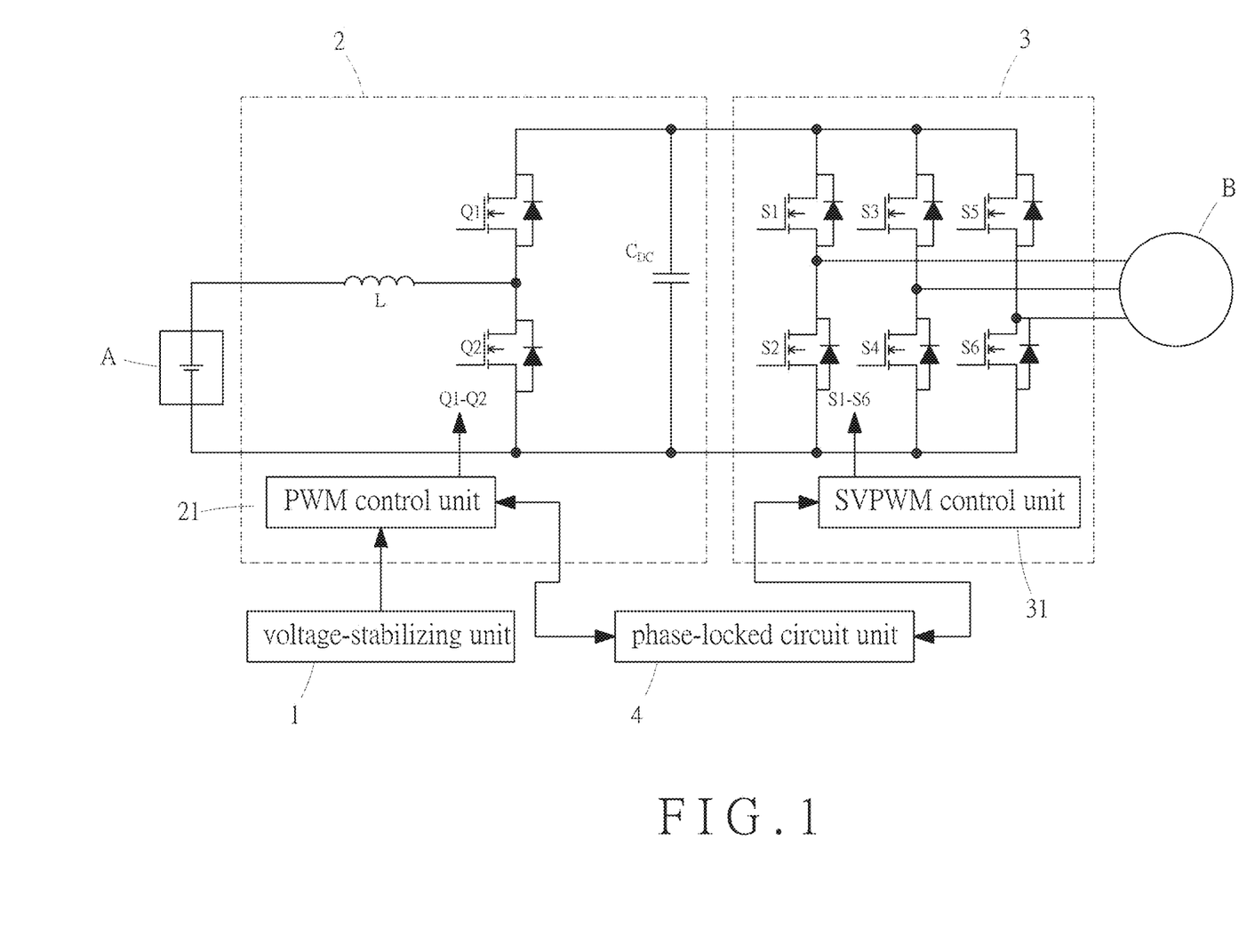
FIG. 1 is a schematic circuit diagram according to an embodiment of the present invention.

Referring to FIG. 1, a circuit system applied to a motor drive according to an embodiment of the present invention, comprising a voltage-stabilizing unit 1, a DC power conversion unit 2, an inverter unit 3 and a phase-locked circuit unit 4 for performing a circuit control method applied to a motor drive.

The DC power conversion unit 2 is a DC-to-DC power converter. The DC power conversion unit 2 includes an inductor L, two power transistors, at least one DC capacitor $C_{DC}$, and a PWM control unit 21. Although only one DC capacitor is shown in FIG. 1, multiple DC capacitors are usually required in practice; the present invention has no limitation on the number of the DC capacitor. The two power transistors serve as a first switch Q1 and a second switch Q2, respectively.

The inverter unit 3 includes a plurality of power transistors and an SVPWM control unit 31. The number of the power transistors in the embodiment of the present invention is six, defined as a first power transistor S1, a second power transistor S2, a third power transistor S3, a fourth power transistor S4, a fifth power transistor S5 and a sixth power transistor S6. Every adjacent two of the power transistors form an arm. More specifically, the first power transistor S1 and the second power transistor S2 form a first arm, the third power transistor S3 and the fourth power transistor S4 form a second arm, and the fifth power transistor S5 and the sixth power transistor S6 form a third arm. The first power transistor S1, the third power transistor S3 and the fifth power transistor S5 serve as the upper arms of the first arm, the second arm, and the third arm, respectively. The second power transistor S2, the fourth power transistor S4 and the sixth power transistor S6 serve as the lower arms of the first arm, the second arm and the third arm, respectively.

Figure 2:
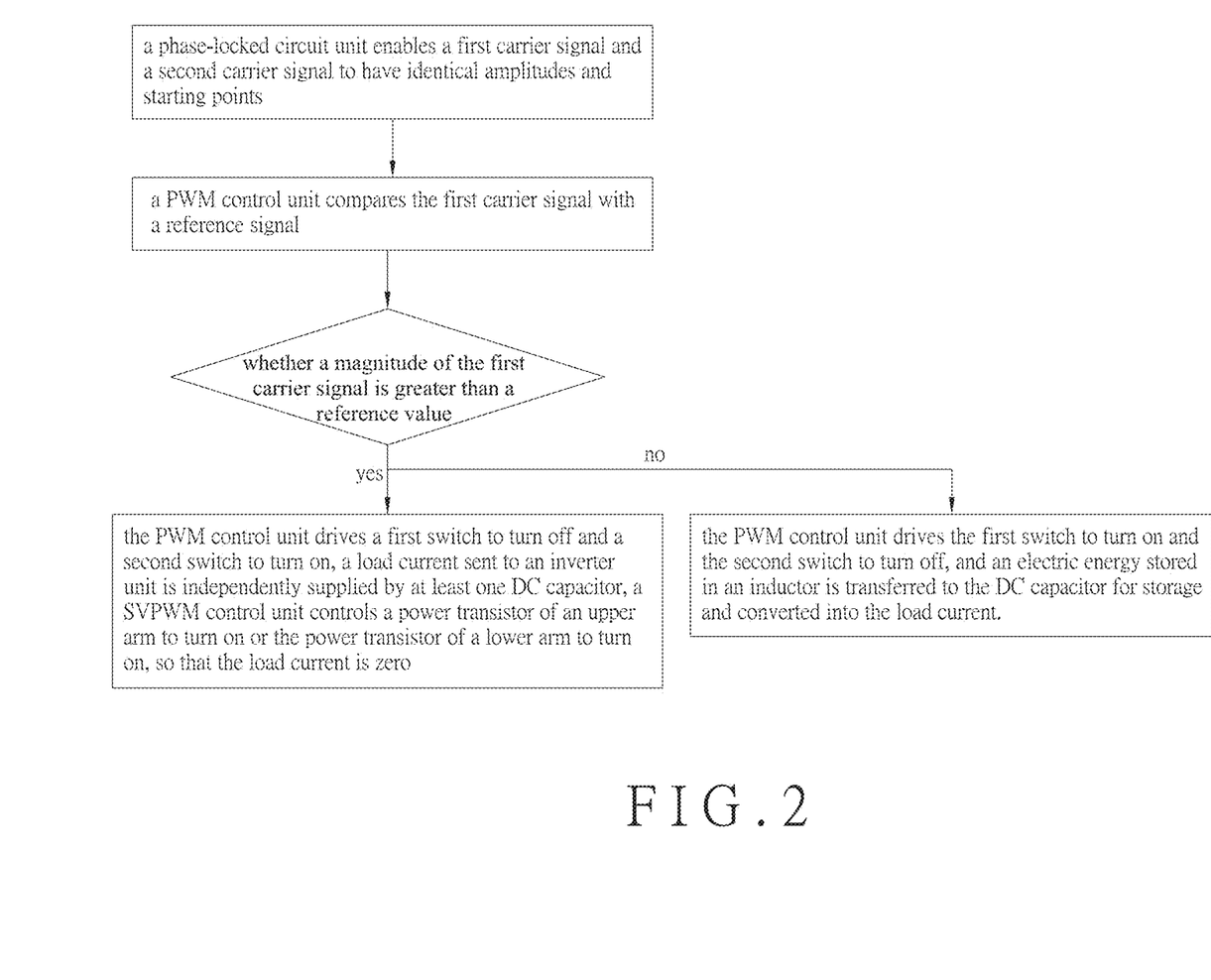
FIG. 2 is a schematic flow diagram according to an embodiment of the present invention.
Figure 3:
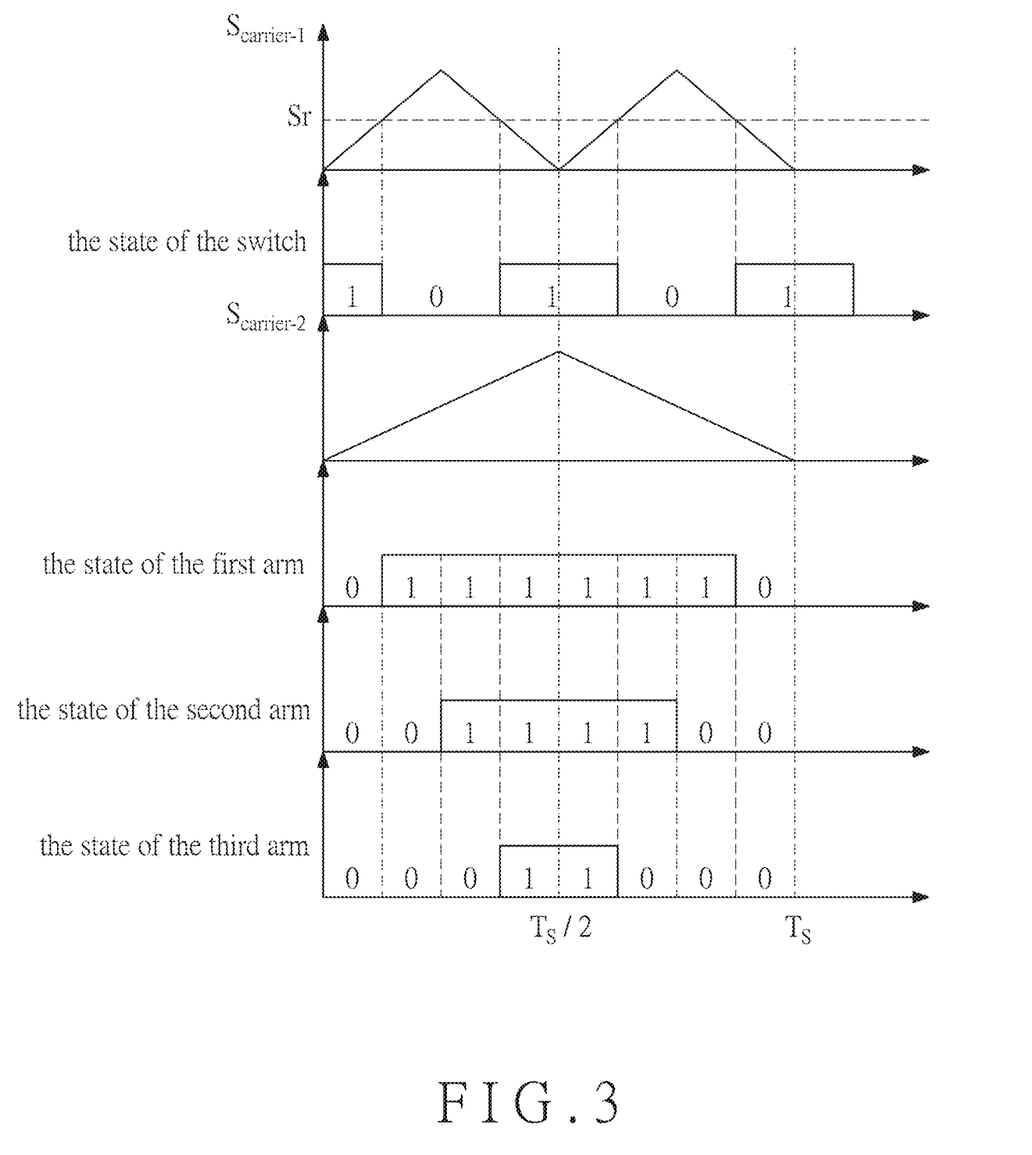
FIG. 3 is a timing diagram according to an embodiment of the present invention.

Referring to FIG. 2 and FIG. 3, in cooperation with FIG. 1, the circuit control method applied to a motor drive comprises the following steps:

The phase-locked circuit unit 4 enables a first carrier signal $S_{carrier-1}$ generated by the DC power conversion unit 2 and a second carrier signal $S_{carrier-2}$ generated by the inverter unit 3 to have identical amplitudes and starting points. The following describes the state in a switching time period $T_S$. In an embodiment of the present invention, both the first carrier signal $S_{carrier-1}$ and the second carrier signal $S_{carrier-2}$ are triangular waves. Since the frequency of the first carrier signal $S_{carrier-1}$ is twice the frequency of the second carrier signal $S_{carrier-2}$. In the switching time period, the first carrier signal $S_{carrier-1}$ has two complete cycles, and the second carrier signal $S_{carrier-2}$ has only one complete cycle. The start point and the end point of the first carrier signal $S_{carrier-1}$ and the second carrier signal $S_{carrier-2}$ are both zero.

The operation of the DC power conversion unit 2 is described below. The voltage-stabilizing unit 1 generates a reference signal through a voltage loop or a current loop, and the reference signal is input to the DC power conversion unit 2. The reference signal is, for example, a wave whose magnitude is fixed to a reference value $S_r$. The reference value $S_r$ may be, for example, half of the maximum peak value of the first carrier signal $S_{carrier-1}$. After the first carrier signal $S_{carrier-1}$ is input to the DC power conversion unit 2, the PWM control unit 21 compares the first carrier signal $S_{carrier-1}$ with the reference value $S_r$. When the magnitude of the first carrier signal $S_{carrier-1}$ is less than the reference value $S_r$, it is in a first state. When the magnitude of the first carrier signal $S_{carrier-1}$ is greater than the reference value $S_r$, it is in a second state. The PWM control unit 21 generates a turn-on command or a turn-off command of the first switch Q1 and the second switch Q2 according to the first state or the second state. Then, the first switch Q1 and the second switch Q2 are turned on or off through proper signal isolation and amplification.

In the first state, the PWM control unit 21 drives the first switch Q1 to turn off and the second switch Q2 to turn on.

At this time, the state of the switch is defined as 1 according to the connection of the second switch Q2. The electric energy of a battery A is stored in the inductor L. A load current sent to the inverter unit 3 is independently supplied by the DC capacitor $C_{DC}$. The electric quantity Q stored in the DC capacitor $C_{DC}$ is represented by a first formula: $Q=I_Ct=C\Delta V_C$, wherein $I_C$ is the load current, t is the time parameter, and $\Delta V_C$ is the voltage change of the DC capacitor $C_{DC}$.

In the second state, the PWM control unit 21 drives the first switch Q1 to turn on and the second switch Q2 to turn off. At this time, the state of the switch is defined as 0 according to the disconnection of the second switch Q2. The electric energy stored in the inductor L is transferred to the DC capacitor $C_{DC}$ for storage and converted into the load current.

Next, the operation of the inverter unit 3 is described below. The state that the upper arms of the first arm, the second arm and the third arm are turned on is defined as 1, and the state that the lower arms are turned on is defined as 0.

In a period of the second carrier signal $S_{carrier-2}$, that is, in the switching time period $T_S$, the control mode of the SVPWM control unit 31 for the power transistors is symmetrical. The sequence is: the lower arms of the first arm, the second arm and the third arm are all turned on, that is, the second power transistor S2, the fourth power transistor S4 and the sixth power transistor S6 are turned on; the upper arm of the first arm is turned on and the lower arms of the second arm and the third arm are turned on, that is, the first power transistor S1, the fourth power transistor S4, and the sixth power transistor S6 are turned on; the upper arms of the first arm and the second arm are turned on and the lower arm of the third arm is turned on, that is, the first power transistor S1, the third power transistor S3 and the sixth power transistor S6 are turned on; the upper arms of the first arm, the second arm and the third arm are all turned on, that is, the first power transistor S1, the third power transistor S3 and the fifth power transistor S5 are turned on; the upper arms of the first arm and the second arm are turned on and the lower arm of the third arm is turned on, that is, the first power transistor S1, the third power transistor S3 and the sixth power transistor S6 are turned on; the upper arm of the first arm is turned on and the lower arms of the second arm and the third arm are turned on, that is, the first power transistor S1, the fourth power transistor S4 and the sixth power transistor S6 are turned on; the lower arms of the first arm, the second arm and the third arm are all turned on, that is, the second power transistor S2, the fourth power transistor S4 and the sixth power transistor S6 are turned on.

When the lower arms of the first arm, the second arm and the third arm are all turned on, or the upper arms of the first arm, the second arm and the third arm are all turned on, that is, when the second power transistor S2, the fourth power transistor S4 and the sixth power transistor S6 are turned on, or the first power transistor S1, the third power transistor S3 and the fifth power transistor S5 are turned on, the load current is zero.

The circuit control method applied to the motor drive is explained below. Because the phase-locked circuit unit 4 enables the first carrier signal $S_{carrier-1}$ and the second carrier signal $S_{carrier-2}$ to have the identical amplitudes and starting points, the first state corresponds to that the lower arms of the first arm, the second arm and the third arm are all turned on, or that the lower arms of the first arm, the second arm and the third arm are all turned on, that is, the first switch Q1 is turned off and the second switch Q2 is turned on, so that when the DC capacitor $C_{DC}$ alone supplies the load current, the load current must be zero. According to the first formula, $\Delta V_C$ is proportional to the magnitude of the load current. When the load current decreases, $\Delta V_C$ will decrease accordingly, thereby reducing the DC voltage ripple, reducing the operation loss when the first switch Q1 and the second switch Q2 are switched and the transient voltage surge of the drain and source of the first switch Q1 and the second switch Q2. In addition, because the DC voltage ripple is reduced, when driving a motor B of the same specification, the required DC capacitance value is also reduced. That is, the number of the DC capacitors $C_{DC}$ required for the drive circuit is reduced, the overall volume of the circuit is reduced, and the power density and operating reliability of the drive circuit of the motor B is further improved.

Figure 4:
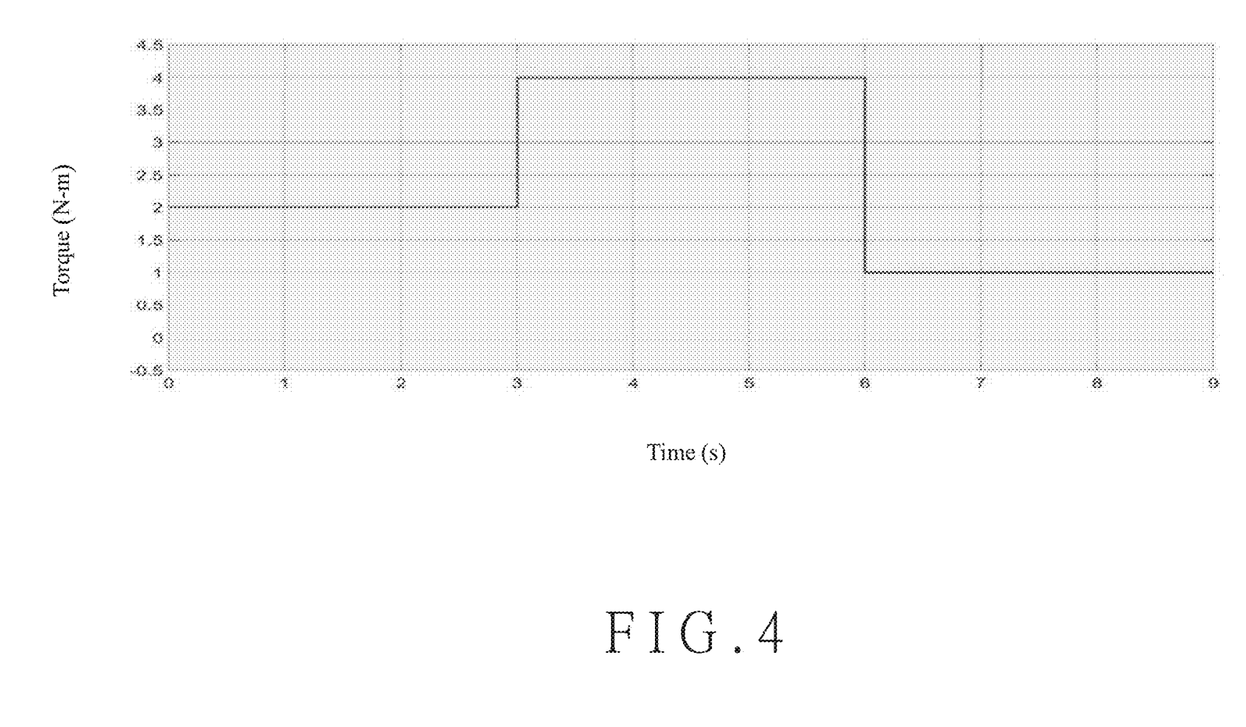
FIG. 4 is an additional torque diagram according to an embodiment of the present invention.

Referring to FIG. 4, in cooperation with FIG. 1 and Table 1 and Table 2 below, in order to verify the correctness of the circuit control method applied to the motor drive, SIMULINK in MATLAB is used for computer circuit simulation calculation. The relevant parameters of the motor B and the DC power conversion unit 2 are shown in Table 1 and Table 2 below.

TABLE 1 the parameters for testing the motor

| Parameter | Numerical value |
| --- | --- |
| rated torque (N · m) | 5 |
| maximum torque (N · m) | 10 |
| rated voltage ($V_{max}$) | 48 |
| rated current ($A_{rms}$) | 70 |
| Maximum current ($A_{rms}$) | 140 |
| rated rotating speed (RPM) | 2000 |
| rated power (kW) | 2.3 |
| number of poles | 8 |
| direct-axis inductance (mH) | 0.135 |
| Quadrature-axis inductance (mH) | 0.16 |
| stator resistance (mΩ) | 65 |
| flux linkage (mWb) | 25.12 |

TABLE 1 the parameters for testing the DC power converter

| Parameter | Numerical value |
| --- | --- |
| input voltage (V) | 24 |
| output voltage (V) | 48 |
| inductance (H) | 8.33 μ |
| Capacitance (F) | 2 m |

For performing simulation with the parameters in Table 1 and Table 2, the rotating speed command for simulation is 1900 rpm, and the additional torque is as shown in FIG. 4. The torque is 2 N-m from 0 to 3 seconds, the torque is increased to 4 N-m from 3 to 6 seconds, and the torque is reduced to 1 N-m after 6 seconds.

Figure 5:
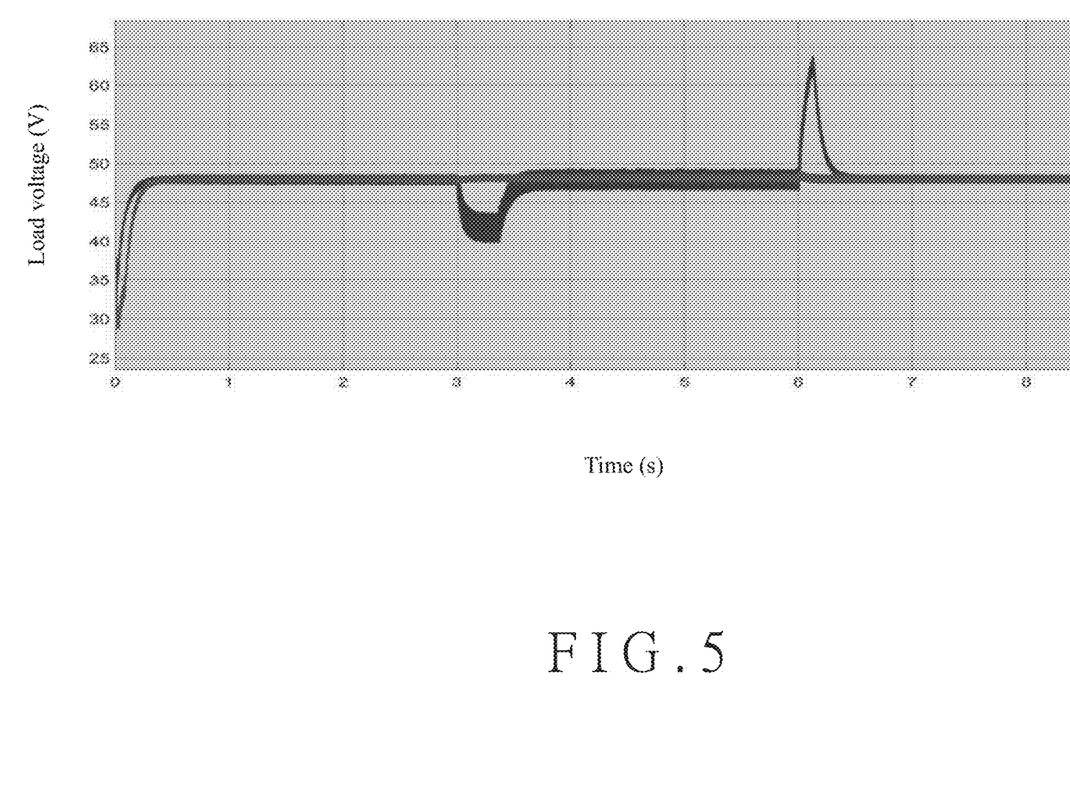
FIG. 5 is a simulation diagram of the relationship between voltage and time according to an embodiment of the present invention.
Figure 6:
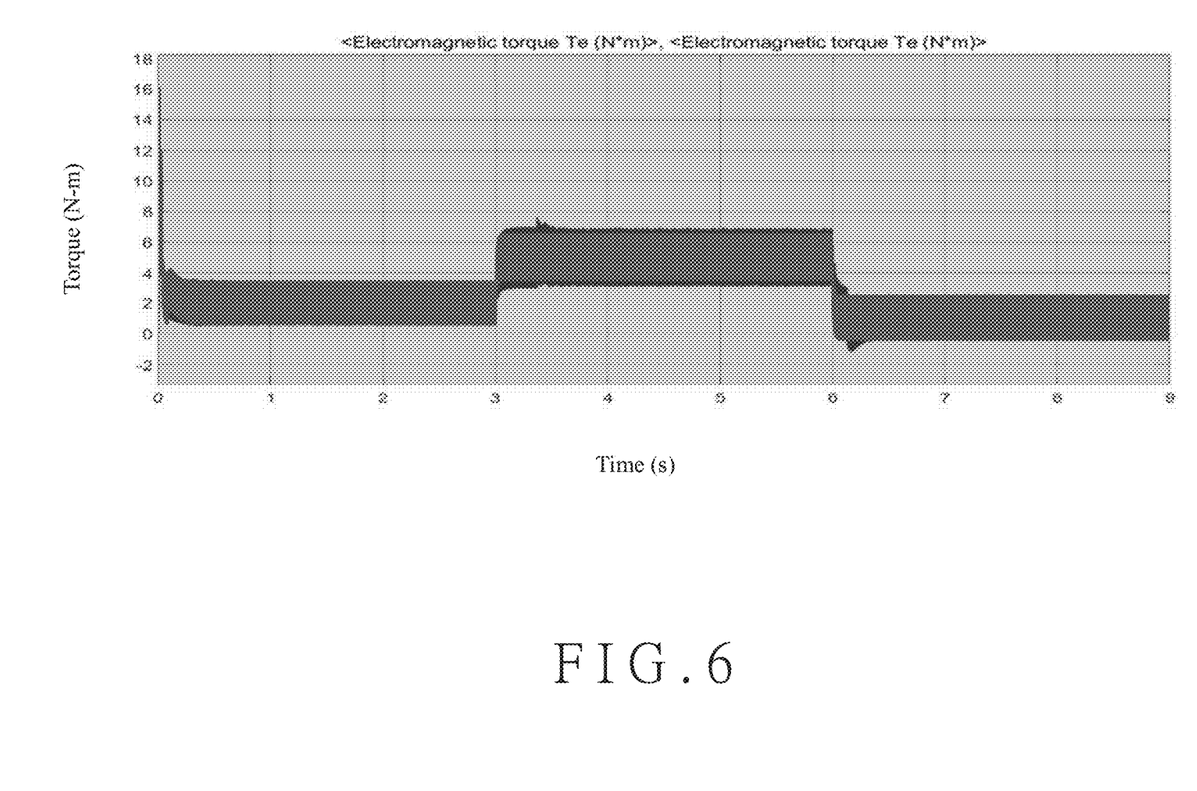
FIG. 6 is a simulation diagram of the relationship between torque and time according to an embodiment of the present invention.
Figure 7:
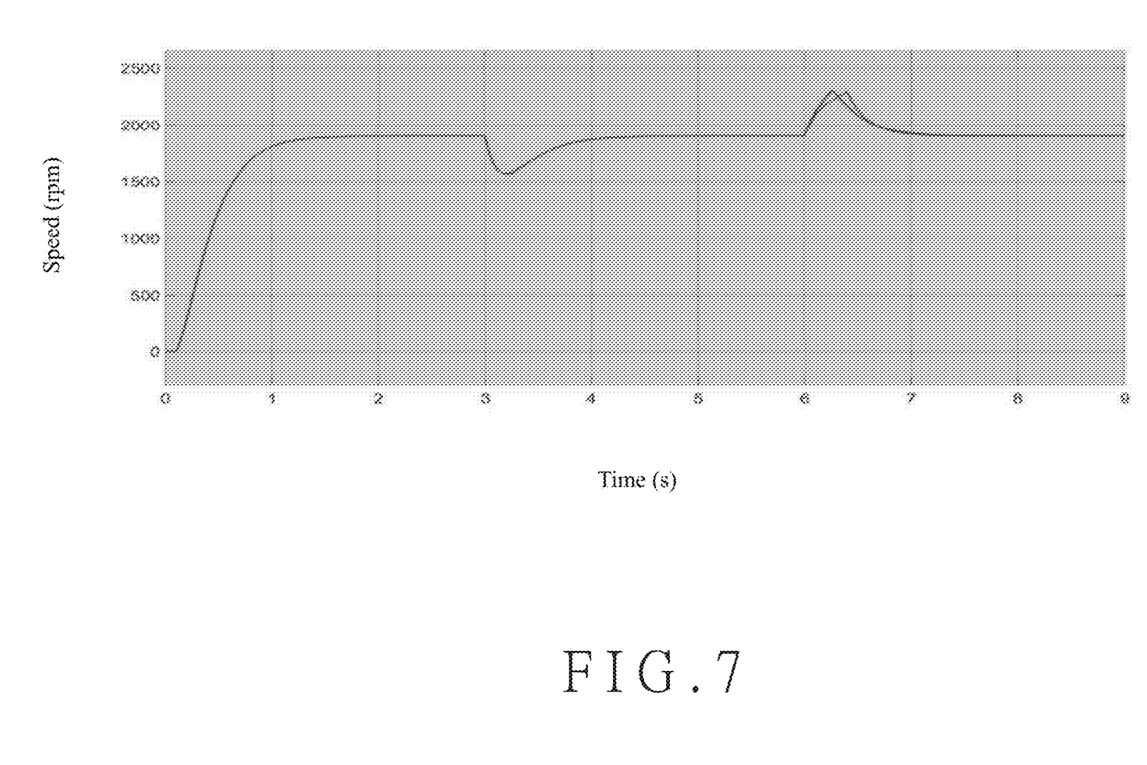
FIG. 7 is a simulation diagram of the relationship between rotating speed and time according to an embodiment of the present invention.

Please refer to FIG. 5 through FIG. 7, in cooperation with FIG. 1. FIGS. 5 to 7 are computer simulation results. The darker curve is the simulation result of the prior art only using the PWM control technology. The lighter curve is the simulation result of the circuit control method applied to the motor drive of the present invention.

As shown in FIG. 5, the DC voltage ripple generated by the prior art is 5.95% during the period of 3 to 6 seconds when the load is maximum. In the present invention, because the load current in the first state is reduced, the DC voltage ripple of a load voltage is only 2.3%, which is better than the prior art significantly. In addition, no matter whether it is loading in 3 seconds or unloading in 6 seconds, the load voltage of the present invention has no transient voltage surge. The present invention does have a better DC voltage variation performance curve.

Since the present invention has a smaller DC voltage ripple, under the same control parameters of the inverter unit 3, the present invention reduces the motor torque ripple compared with the prior art. As shown in FIG. 6, the motor torque ripple of the prior art is 76.5% during the period of 3 to 6 seconds when the load is maximum. The motor torque ripple of the present invention is reduced to 62.5%, which indeed reduces the motor torque ripple.

As shown in FIG. 7, compared with the prior art, the present invention not only has the aforementioned advantages but also accurately controls the rotating speed of the motor B, without negatively affecting the driving of the motor B.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A circuit system applied to a motor drive, comprising:
a voltage-stabilizing unit;
a DC power conversion unit, electrically connected to the voltage-stabilizing unit, the DC power conversion unit including a PWM control unit, a first switch, a second switch, and at least one DC capacitor;
an inverter unit, electrically connected to the DC power conversion unit, the inverter unit including an SVPWM control unit and a power transistor; and
a phase-locked circuit unit, electrically connected to the DC power conversion unit and the inverter unit, the phase-locked circuit unit enabling a first carrier signal generated by the DC power conversion unit and a second carrier signal generated by the inverter unit to have identical amplitudes and starting points;
wherein the voltage-stabilizing unit generates a reference signal to the DC power conversion unit, the PWM control unit compares the first carrier signal with the reference signal, the PWM control unit generates a turn-on command or a turn-off command of the first switch and the second switch according to a comparison result;
wherein when the PWM control unit drives the first switch and the second switch to turn on or off, a load current sent to the inverter unit is independently supplied by the DC capacitor, the SVPWM control unit controls the power transistor of an upper arm of the inverter unit to turn on or the power transistor of a lower arm of the inverter unit to turn on, so that the load current is zero.

2. The circuit system as claimed in claim 1, wherein the DC power conversion unit includes an inductor, when a magnitude of the first carrier signal is less than a reference value of the reference signal, the PWM control unit drives the first switch to turn off and the second switch to turn on, and the load current sent to the inverter unit is independently supplied by the DC capacitor; when the magnitude of the first carrier signal is greater than the reference value, the PWM control unit drives the first switch to turn on and the second switch to turn off, and an electric energy stored in the inductor is transferred to the DC capacitor for storage and converted into the load current.

3. The circuit system as claimed in claim 1, wherein the DC power conversion unit is a DC-to-DC power converter.

4. A circuit control method applied to a motor drive, comprising the steps of:
providing a phase-locked circuit unit, the phase-locked circuit unit enabling a first carrier signal generated by a DC power conversion unit and a second carrier signal generated by a inverter unit to have identical amplitudes and starting points;
providing a voltage-stabilizing unit, the voltage-stabilizing unit generating a reference signal to the DC power conversion unit, a PWM control unit of the DC power conversion unit comparing the first carrier signal with the reference signal, the PWM control unit generating a turn-on command or a turn-off command of a switch according to a comparison result;
wherein when the PWM control unit drives the switch to turn on or off, a load current sent to the inverter unit is independently supplied by at least one DC capacitor, a SVPWM control unit of the inverter unit controls a power transistor of an upper arm of the inverter unit to turn on or the power transistor of a lower arm of the inverter unit to turn on, so that the load current is zero.

5. The circuit control method as claimed in claim 4, wherein the switch includes a first switch and a second switch, when a magnitude of the first carrier signal is less than a reference value of the reference signal, the PWM control unit drives the first switch to turn off and the second switch to turn on, and the load current sent to the inverter unit is independently supplied by the DC capacitor; when the magnitude of the first carrier signal is greater than the reference value, the PWM control unit drives the first switch to turn on and the second switch to turn off, and an electric energy stored in an inductor of the DC power conversion unit is transferred to the DC capacitor for storage and converted into the load current.

6. The circuit control method as claimed in claim 4, wherein the DC power conversion unit is a DC-to-DC power converter.

* * * * *